US011680605B2

(12) United States Patent
Baumann et al.

(10) Patent No.: US 11,680,605 B2
(45) Date of Patent: Jun. 20, 2023

(54) BEARING ASSEMBLY

(71) Applicant: Aktiebolaget SKF, Gothenburg (SE)

(72) Inventors: Michael Baumann, Gädheim (DE); Matthias Hofmann, Schweinfurt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 268 days.

(21) Appl. No.: 16/217,162

(22) Filed: Dec. 12, 2018

(65) Prior Publication Data

US 2019/0186548 A1    Jun. 20, 2019

(30) Foreign Application Priority Data

Dec. 14, 2017    (DE) ...................... 10 2017 222 788.5

(51) Int. Cl.
*F16C 41/00*    (2006.01)
*F03B 11/06*    (2006.01)
(Continued)

(52) U.S. Cl.
CPC ............ *F16C 41/001* (2013.01); *F03B 11/06* (2013.01); *F03B 13/264* (2013.01); *F03D 80/70* (2016.05); *F16C 17/02* (2013.01); *F16C 19/184* (2013.01); *F16C 19/38* (2013.01); *F16D 55/22* (2013.01); *F16D 65/18* (2013.01); *F03D 7/0204* (2013.01); *F05B 2210/16* (2013.01); *F05B 2220/706* (2013.01); *F05B 2240/57* (2013.01); *F05B 2260/902* (2013.01); *F16C 17/00* (2013.01); *F16C 19/08* (2013.01); *F16C 33/72* (2013.01); *F16C 2360/31* (2013.01);
(Continued)

(58) Field of Classification Search
CPC .... F03D 7/0248; F03D 7/0204; F03D 7/0244; F03D 80/55
See application file for complete search history.

(56) References Cited

U.S. PATENT DOCUMENTS 3,773,336 A * 11/1973 Walter ................... B63H 23/36
                                                                277/551
5,221,146 A    6/1993 Maruyama
(Continued)

FOREIGN PATENT DOCUMENTS

CN        203 730 567 U    7/2014    ............ F03D 80/70
CN        203730567 U      7/2014
(Continued)

OTHER PUBLICATIONS

Translation of JP2010019340, Nov. 17, 2021.*
(Continued)

*Primary Examiner* — Topaz L. Elliott
*Assistant Examiner* — Cameron A Corday
(74) *Attorney, Agent, or Firm* — J-Tek Law PLLC; Scott T. Wakeman; Mark A. Ussai

(57) ABSTRACT

A bearing assembly, such as for a wind turbine or a tidal turbine including a tower and a nacelle, includes a lower part that is attachable to the tower, an upper part that is attachable to the nacelle, a bearing that rotatably couples the lower part to the upper part to allow rotation of the nacelle with respect to the tower, and a brake mechanism configured to selectively prevent relative rotation of the upper part and the lower part. The brake mechanism includes a brake disc and a brake caliper.

20 Claims, 2 Drawing Sheets

(51) Int. Cl.
*F03D 80/70* (2016.01)
*F03B 13/26* (2006.01)
*F16C 17/02* (2006.01)
*F16C 19/18* (2006.01)
*F16C 19/38* (2006.01)
*F16D 55/22* (2006.01)
*F16D 65/18* (2006.01)
*F16C 19/08* (2006.01)
*F16C 33/72* (2006.01)
*F16C 17/00* (2006.01)
*F03D 7/02* (2006.01)
*F16D 121/04* (2012.01)
*F16D 121/24* (2012.01)

(52) U.S. Cl.
CPC ...... *F16D 2121/04* (2013.01); *F16D 2121/24* (2013.01); *F16D 2200/0034* (2013.01)

(56) References Cited

U.S. PATENT DOCUMENTS

| | | | |
|---|---|---|---|
| 7,988,364 B2 | 8/2011 | Versteegh et al. | F16C 33/74 |
| 8,075,266 B2 * | 12/2011 | Keller | F03D 7/0204 |
| | | | 416/37 |
| 8,212,372 B2 * | 7/2012 | Fujioka | F16J 15/002 |
| | | | 290/55 |
| 2010/0014791 A1 * | 1/2010 | Versteegh | F16J 15/54 |
| | | | 384/147 |
| 2010/0080702 A1 * | 4/2010 | Matsuo | F03D 7/0204 |
| | | | 416/1 |
| 2010/0247295 A1 * | 9/2010 | Hofmann | F03D 80/70 |
| | | | 384/571 |
| 2011/0171022 A1 * | 7/2011 | Behnke | F03D 7/0244 |
| | | | 416/1 |
| 2012/0195538 A1 * | 8/2012 | Hori | F16C 19/20 |
| | | | 384/521 |
| 2014/0191508 A1 | 7/2014 | Schröppel et al. | F03B 13/10 |
| 2015/0337804 A1 * | 11/2015 | Jensen | F03D 80/55 |
| | | | 416/169 R |
| 2019/0257294 A1 * | 8/2019 | Abreu | F03D 80/82 |

FOREIGN PATENT DOCUMENTS

| | | | | |
|---|---|---|---|---|
| CN | 205744308 U | | 11/2016 | F03D 80/00 |
| CN | 205744308 U | | 11/2016 | |
| DE | 196 29 168 | C1 | 10/1997 | F03D 80/70 |
| DE | 19629168 | C1 | 10/1997 | |
| DE | 202007019326 | U1 * | 1/2012 | F16C 33/60 |
| DE | 202007019326 | U1 | 1/2012 | F16D 71/04 |
| EP | 2 829 726 | A1 | 1/2015 | F03D 80/70 |
| EP | 2829726 | A1 | 1/2015 | |
| JP | 2010019340 | * | 1/2010 | |
| WO | 2009097867 | A1 | 8/2009 | |
| WO | 2016137625 | A1 | 9/2016 | |

OTHER PUBLICATIONS

SKF, "SKF Spherical Roller Bearing" SKF Spherical Roller Bearings, May 2007.
Schaeffler Technologies GmbH & Co. KG, "The Design of Rolling Bearings" FAG the design of rolling bearings, Jul. 2011.
DIN German Institute for Standardization e.V., "Rolling Bearings—Radial spherical roller bearings—Part 2: Double row, cylindrical and tapered bore" DIN German Institute for Standardization e.V., Jan. 2009.
Communication from the European Patent Office dated Jun. 15, 2020 in related EP application No. 18 211 540.2.
Communication from the European Patent Office dated May 10, 2019 in related EP application No. 18 211 540.2.
Office Action and Search Report from the Chinese Patent Office dated Aug. 4, 2021 in related application No. 201811522713.9, and translation thereof.

* cited by examiner

BEARING ASSEMBLY

CROSS-REFERENCE

This application claims priority to German patent application no. 10 2017 222 788.5 filed on Dec. 14, 2017, the contents of which are fully incorporated herein by reference.

TECHNOLOGICAL FIELD

The present disclosure relates to a bearing assembly for a wind turbine or a tidal turbine that has a tower and a nacelle which bearing assembly includes a lower part that is attachable to the tower and an upper part that is attachable to the nacelle.

BACKGROUND

In wind or tidal turbines, bearing assemblies are used to rotatably connect a tower to a nacelle of the turbine. Here a lower part of the bearing assembly is attached to the tower, and an upper part of the bearing assembly is attached to the nacelle. The nacelle can be oriented by the bearing assembly based on a wind direction or flow direction in order to optimize energy generation. If the nacelle is aligned properly for prevailing conditions, the bearing assembly can be locked.

Such a brake mechanism is known from WO 2016/137625 A1 (family member of U.S. Pat. No. 10,072,715 B2). Herein a bearing assembly includes rings with locking holes into which bolts can engage in order to lock the nacelle with respect to the tower. However, here the nacelle can only be locked in certain prescribed positions.

SUMMARY

It is therefore an aspect of the present disclosure to provide a bearing assembly that allows the nacelle to be locked in a flexible manner.

In the following such a bearing assembly is described in more detail. The bearing assembly includes a bearing that permits the nacelle to rotate with respect to the tower. In particular, the nacelle can be oriented with respect to a wind or flow direction. The orientation can be effected, for example, to allow for optimal energy generation. In order to orient the nacelle, the bearing assembly can determine the wind or tidal direction via sensors and drive electric servomotors to orient the nacelle.

The bearing assembly further includes a locking device in order to lock the nacelle in a fixed position with respect to the tower. The locking can be effected, for example, when the nacelle is oriented as described above.

In order to allow a flexible locking of the nacelle with respect to the tower, the locking device includes a brake mechanism including a brake disc and at least one brake caliper. Here the brake caliper, also called a brake saddle, can be formed hydraulically via pistons or electromechanically, for example, via a spindle. The number of brake calipers is variable and is determined by the necessary braking force and space conditions.

The disclosed brake mechanism offers the advantage that the nacelle can be locked in any desired position with respect to the tower. A very flexible orienting and locking of the nacelle is thus made possible. The brake mechanism is preferably coupled to a drive in order to activate the brake device. The drive serves to drive the brake calipers such that they interact with the brake disc, i.e., to clamp brake linings in the brake calipers against the brake disc in order to brake and/or to lock the nacelle.

To date bearing assemblies are supplied as individual parts and are installed and assembled on-site in the turbine. However, after the installation they must be tested, for example, for seal tightness. In order to avoid this, the disclosed bearing assembly can be provided as a complete system and installed in the turbine in the already-assembled state. In this way a plug-and-play solution is provided that can be easily integrated into a power plant. This reduces possible errors in installation. The necessary tests, such as, for example, for seal tightness, can thus already be effected during manufacturing.

According to one embodiment the brake disc can be disposed on the lower part and the brake caliper on the upper part. This means that the brake disc is disposed on the tower as a stationary part and the brake caliper is disposed on the nacelle as a rotating part. Alternatively the brake disc can be disposed on the upper part and the brake caliper on the lower part.

The brake caliper can be an electrically driven brake caliper. In this case the driving can be effected via a servomotor. An electric drive has the advantage that no hydraulic fluid is present and thus no leakage can occur.

The driving can be effected via an electric motor in combination with a rolling spindle. If the power supply of the electric motor fails, the braking and locking effect of the brake mechanism is active since the rolling spindle provides a self-locking in connection with a magnetic brake of the electric motor. If the brake mechanism must be released in the event of a power failure, the emergency actuation of the electric brake can be effected via an emergency power supply (for example, batteries or super capacitors).

Alternatively the brake caliper can be a hydraulically driven brake caliper. In comparison to an electrically driven brake caliper, a hydraulically driven brake caliper can be configured more compact since no servomotor is required.

In particular, if the turbine is a tidal turbine, the bearing assembly must be sealed against water and/or dirt entry. For this purpose a seal is required that also withstands high pressures such as prevail under water at great depth.

For this purpose the bearing assembly can include a seal assembly that is integrated in the bearing assembly. Since the bearing assembly is preferably provided as a system solution, i.e., in the assembled state, the seal can already be tested. The seal can thus already be guaranteed with delivery of the bearing assembly.

The seal assembly can be a seal system that is comprised of a plurality of radial seals and a bushing interacting therewith, against which the radial seals seal. The seal system is preferably attached to an underside of the bearing of the bearing assembly. Here the radial seals are disposed one over the other. Each radial seal can be attached in a separate seal carrier ring that can mechanically support the respective seal, which seal is under pressure. The seal carrier rings can be connected to each other by screws and a centering device.

The bushings can be comprised of seal or a coating that withstands a high risk of corrosion in the offshore area. The bushing can be mounted on the underside of the bearing assembly by press-fit onto the bearing ring or a component connected thereto.

The first, i.e., lowest, radial seal preferably serves as protection against an entry of dirt, such as, for example, sand or sediments, in order to protect the second radial seal disposed thereover. The seal carrier ring of the first radial seal can be attached to a side surface of the outer ring of the bearing. The third and following radial seals serve in particular for protection against a water entry due to the high water pressure at a depth of up to 50 m.

A suitable lubricant, such as, for example, grease, can be disposed between the individual radial seals. Furthermore, a water drainage channel can preferably be provided between the second and third radial seal, which water drainage channel extends through the seal carrier ring and the outer ring of the bearing.

The bearing serves to support radial and axial loads as well as bending moments of the nacelle. For this purpose the bearing can be a rolling-element bearing or a plain bearing. Single row or double row four-point contact ball bearings, crossed roller bearings, or triple ring bearings can be used as rolling-element bearings. The rollers or balls of the bearing can be separated from each other by a window-type cage.

In one embodiment the brake caliper can include a brake lining that includes a nickel-diamond coating. A particularly high friction coefficient can be achieved by such a coating. In this way a higher braking power can be achieved than with brake linings that are, for example, comprised of an organic lining or sintered lining. The brake disc can be comprised of a steel ring.

In another embodiment, the bearing assembly includes a motor configured to drive an attached pinion gear, and the pinion gear engages an internal gear on the lower part such that rotation of the pinion gear by the motor rotates the nacelle with respect to the tower. The motor may be located at least partially radially inside the upper part, and at least a portion of the pinion gear may be located axially and radially inside the bearing.

According to a further aspect a turbine is disclosed, in particular wind or tidal turbine, including a bearing assembly as described above.

Further advantages and advantageous embodiments are specified in the description, the drawings, and the claims. Here in particular the combinations of features specified in the description and in the drawings are purely exemplary, so that the features can also be present individually or combined in other ways.

In the following the invention shall be described in more detail using exemplary embodiments depicted in the drawings. Here the exemplary embodiments and the combinations shown in the exemplary embodiments are purely exemplary and are not intended to define the scope of the invention. This scope is defined solely by the pending claims.

DETAILED DESCRIPTION

In the following, identical or functionally equivalent elements are designated by the same reference numbers.

Figure 1:
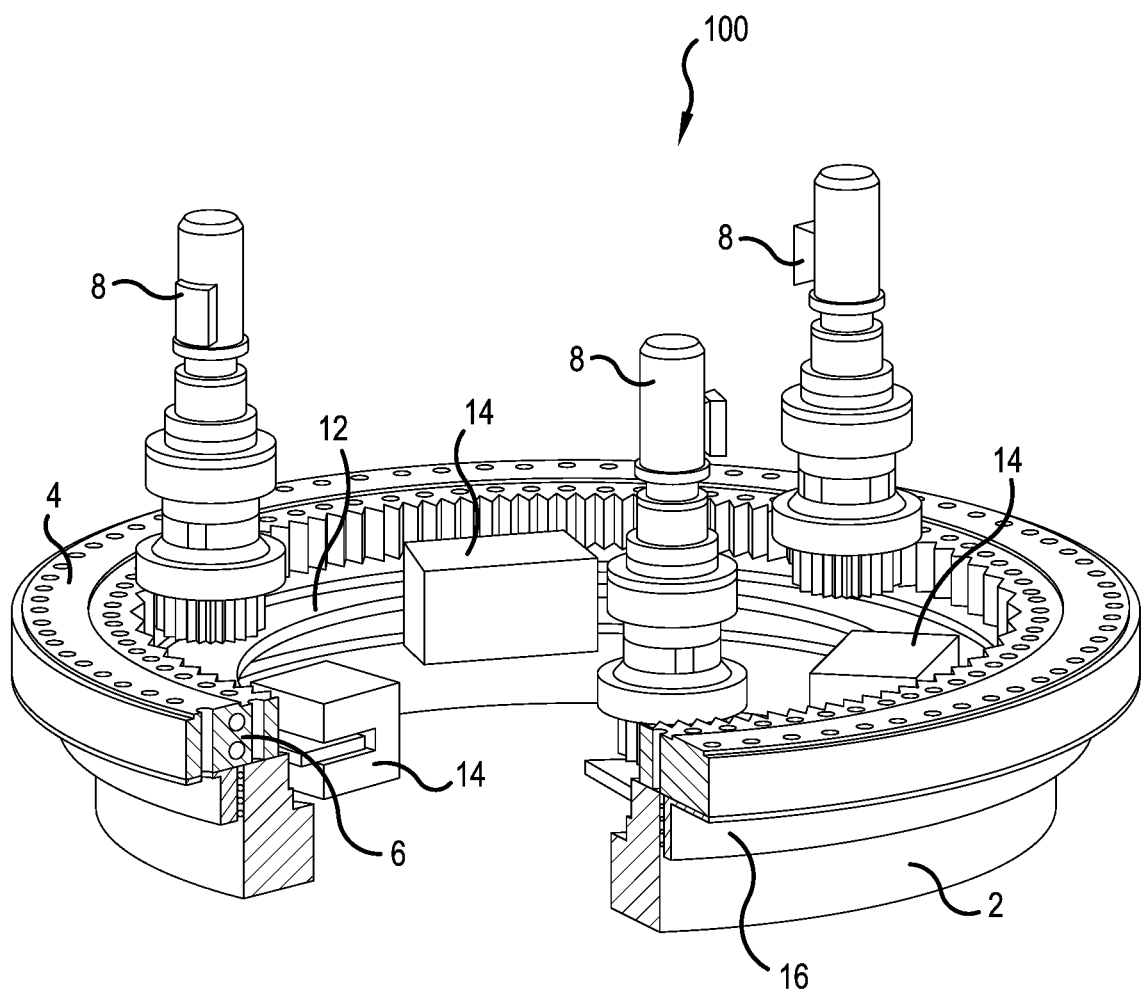
FIG. 1 is a bearing assembly for a wind turbine or a tidal turbine which assembly includes adjusting drives and a locking device.

FIG. 1 shows a bearing assembly 100 for a wind turbine or a tidal turbine. The wind or tidal turbine includes a tower and a nacelle.

The bearing assembly 100 includes a lower part 2 that is attachable to the tower. An upper part 4 of the bearing assembly 100 is attachable to the nacelle.

The bearing assembly 100 includes a bearing 6 that allows the nacelle to rotate relative to the tower. The bearing 6 can be, for example, a double row ball bearing 6, as is shown in FIG. 1.

In order to ensure optimal energy generation, the nacelle can be oriented with respect to the tower based on a wind or flow direction. For this purpose servomotors 8 are provided in the bearing assembly 100.

If the nacelle is oriented in a desired manner, the nacelle can be locked in this position by the bearing assembly 100. For this purpose the bearing assembly 100 includes a locking device.

The locking device includes a brake mechanism that is comprised of a brake disc 12 and at least one brake caliper 14.

In the example shown in FIG. 1 the brake disc 12 is disposed on the lower part 2 and the brake caliper 14 on the upper part. Alternatively this arrangement can also be reversed. The locking device 10 is described in more detail in connection with FIG. 2.

In addition to the seals present in the bearing 6, the bearing assembly 100 includes a seal assembly 16 that is integrated in the bearing assembly 100, and is configured to seal the bearing 6 against water and/or dirt entry. The seal assembly 16 is described in more detail in FIG. 3.

Although the bearing is shown as a double row ball bearing, it can also be configured as a plain bearing.

The brake caliper 14 can also be configured as a double brake caliper. Due to the use of the brake caliper 14 and the brake disc 12, the nacelle can be locked in any position with respect to the tower.

The locking device 10 is preferably coupled to a drive (not shown). The drive serves to drive the brake calipers 14 such that they interact with the brake disc 12, i.e., clamp brake linings that are built into the brake caliper 14 over the brake disc in order to brake and/or lock the nacelle.

Figure 2:
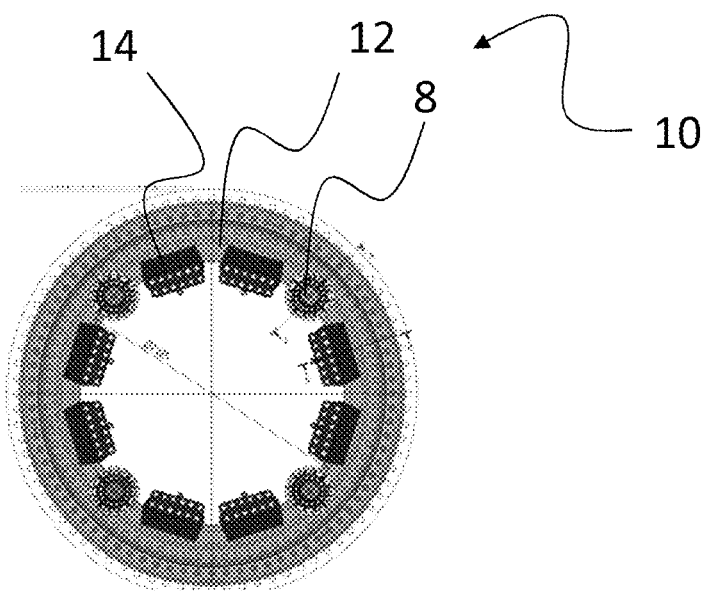
FIG. 2 is an example of a locking device of the bearing assembly of FIG. 1 with increased drive power and a reinforced locking device.

In the example shown in FIG. 2, eight hydraulic brake calipers 14 are provided that interact with the brake disc 12. In total four servomotors 8 are provided between each two pairs of brake calipers 14.

Alternatively electromechanical single or double brake calipers 14 can be used. Here the number of servomotors 8 and the number of brake calipers 14 can vary.

As already explained above, the bearing assembly 100 includes a seal assembly 16 in order to seal the bearing 6 with respect to a water and dirt entry.

Figure 3:
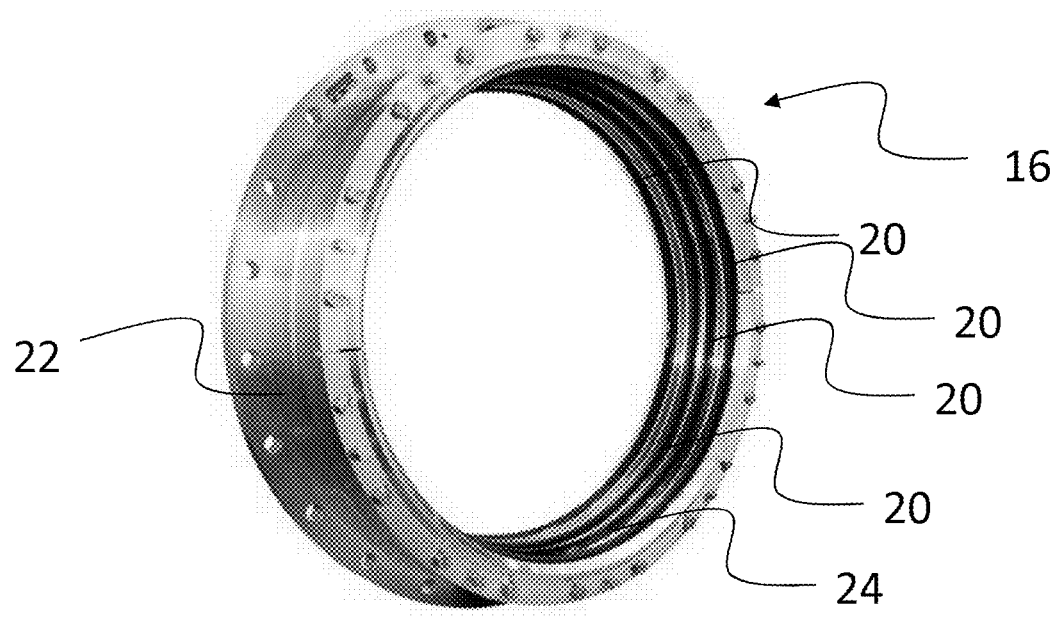
FIG. 3 is an exemplary seal against sea water for the bearing assembly of FIG. 1.

An example of such a seal 16 is shown in FIG. 3. The seal assembly 16 can be a seal system that includes four radial seals 20 and a seal flange ring 22 that can be screwed onto an outer ring of the bearing assembly 100. Here the radial seals 20 are disposed one-over-the-other or adjacent to one another and have the same seal diameter. Each radial seal 20 can be attached in a separate seal carrier ring 24, which can mechanically support the respective seal 20, which seal 20 is under pressure. Here the contour of the carrier rings 20 is configured such that a seal lip of the radial seal abuts axially against the contour due to the abutting water pressure and is thereby supported axially and radially.

The first, i.e., lowest, radial seal 20 can serve for protection against an entry of sand or sediment in order to protect the radial seals 20 disposed thereon. The seal carrier ring 24 of the first radial seal 20 can be attached to a side surface of the outer ring of the bearing. The third and subsequent radial seal 20 serves in particular for protection against a water entry due to the high water pressure with a tidal turbine.

A suitable lubricant, such as, for example, grease, can be disposed between the individual radial seals 20. For example, a water drainage channel (not shown) can be provided between the second and third radial seals 20, which water drainage channel extends through the seal carrier ring 24 and the outer ring of the bearing 6.

In summary the disclosed bearing assembly provides a very flexible positioning of a nacelle of a turbine with respect to a tower. Since the locking device 10 of the bearing assembly is realized by brake caliper and a brake disc the nacelle can be locked in any position with respect to the tower. A very flexible orienting and locking of the nacelle is thus made possible.

At the same time the disclosed bearing assembly can be provided as a complete system so that a simple use is possible in a turbine. A test for seal tightness and function of the bearing assembly is no longer required on-site, i.e., with installation into the turbine, since this can already be effected with the manufacturing of the bearing assembly.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide bearing assemblies for wind and/or tidal turbines.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

2 Lower part
4 Upper part
6 Bearing
8 Servomotor
10 Locking device
12 Brake disk
14 Brake caliper/brake saddle
16 Seal assembly
20 Radial seal
22 Seal flange ring
24 Seal carrier ring
100 Bearing assembly

What is claimed is:

1. A bearing assembly for a wind turbine or a tidal turbine including a tower and a nacelle, the bearing assembly comprising:
    a lower part configured to be attached to the tower and including a radially outer cylindrical surface,
    an upper part configured to be attached to the nacelle,
    a bearing rotatably coupling the lower part to the upper part to allow rotation of the nacelle with respect to the tower about an axis of rotation,
    a brake mechanism configured to selectively prevent relative rotation of the upper part and the lower part, the brake mechanism comprising a brake disc and a brake caliper, and
    a seal assembly, the seal assembly comprising a housing having a first portion fixedly connected to the upper part, a cylindrical second portion depending from the first portion and encircling a portion of the radially outer cylindrical surface of the lower part, and at least one seal element mounted to an interior of the second portion and contacting the radially outer cylindrical surface of the lower part to form a seal therewith.

2. The bearing assembly according to claim 1, wherein the brake disc is disposed on the lower part, and the brake caliper is disposed on the upper part, or wherein the brake disc is disposed on the upper part, and the brake caliper is disposed on the lower part.

3. The bearing assembly according to claim 1, wherein the brake caliper is an electrically driven brake caliper.

4. The bearing assembly according to claim 1, wherein the brake caliper is a hydraulically driven brake caliper.

5. The bearing assembly according to claim 1, wherein the bearing is a rolling-element bearing.

6. The bearing assembly according to claim 1, wherein the bearing is a double-row ball bearing.

7. The bearing assembly according to claim 1, wherein the brake caliper includes a brake lining that includes organic linings or sintered linings or linings including a nickel-diamond coating.

8. The bearing assembly according to claim 1, wherein the brake caliper includes a nickel-diamond coated brake lining.

9. The bearing assembly according to claim 1,
    wherein the brake disc is disposed on the lower part and the brake caliper is disposed on the upper part,
    wherein the brake caliper is a hydraulically driven brake caliper,
    wherein the bearing is a rolling-element bearing, and
    wherein the brake caliper includes a nickel-diamond coated brake lining.

10. A wind turbine or a tidal turbine including the bearing assembly according to claim 1.

11. The bearing assembly according to claim 1,
    wherein the first portion comprises a flange having a diameter greater than a diameter of the second portion.

12. The bearing assembly according to claim 11,
    wherein the flange includes a plurality of through holes extending parallel to the axis of rotation via which the housing is fastened to a bottom side of the upper part.

13. The bearing assembly according to claim 11,
    wherein the at least one seal element is mounted in a seal carrier.

14. The bearing assembly according to claim 11,
    wherein the at least one seal element comprises a plurality of seal elements, and
    wherein each seal element of the plurality of seal elements is mounted in a respective seal carrier ring.

15. The bearing assembly according to claim 14, wherein the at least one seal element comprises at least one radial seal element.

16. A wind turbine or a tidal turbine including the bearing assembly according to claim 15.

17. The bearing assembly according to claim 1,
including a motor configured to drive a pinion gear,
wherein the lower part includes an internal gear, and
wherein the pinion gear engages the internal gear such that rotation of the pinion gear by the motor rotates the nacelle with respect to the tower.

18. The bearing assembly according to claim 17,
wherein the motor is located at least partially radially inside the upper part.

19. The bearing assembly according to claim 1,
including a motor configured to rotate the nacelle with respect to the tower, the motor being located at least partially radially inside the upper part.

20. The bearing assembly according to claim 1,
including a motor configured to drive a pinion gear, at least a portion of the pinion gear being located axially and radially inside the bearing.

\* \* \* \* \*